May 16, 1944.        T. D. CROWLEY ET AL        2,349,078
BUTTER CUTTING DEVICE
Filed Aug. 11, 1942
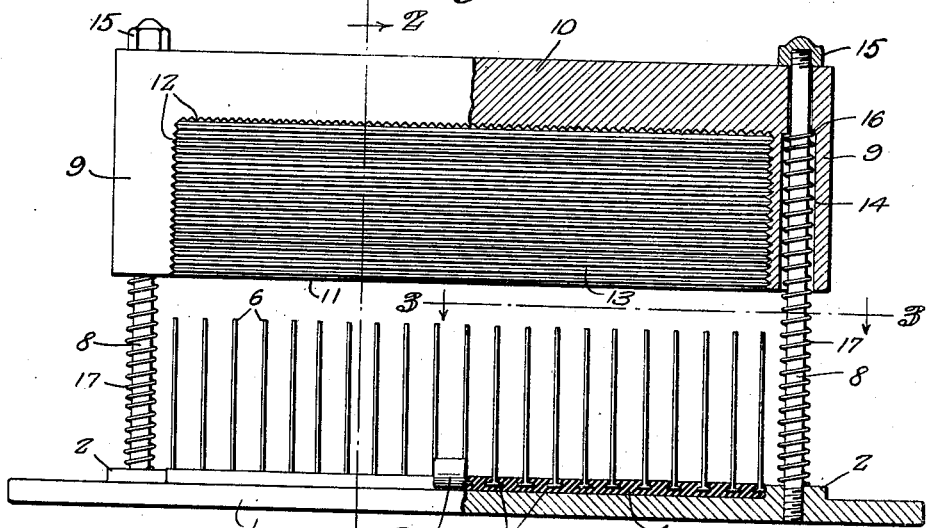
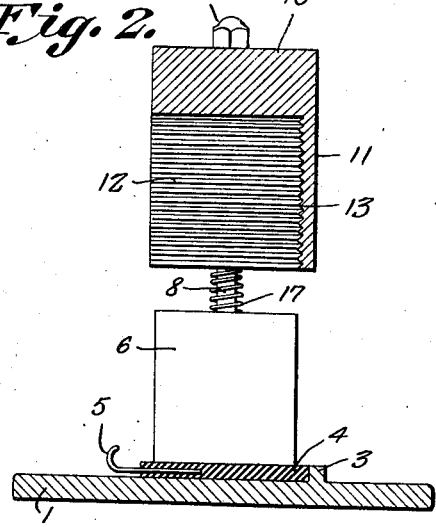
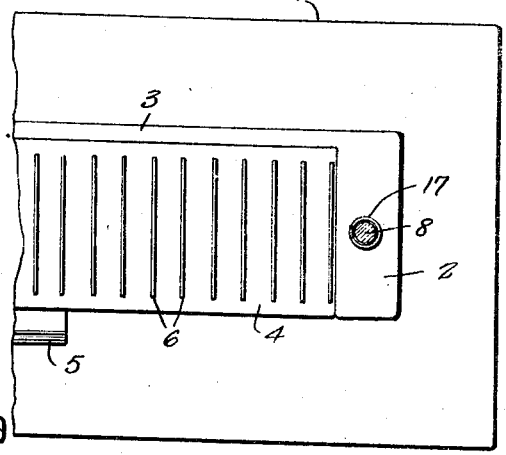
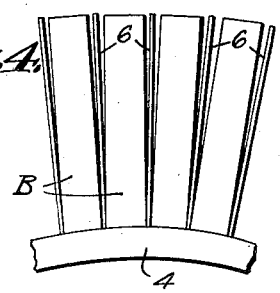
Theodore D. Crowley,
Benjamin C. Potter,
INVENTORS
BY
Victor J. Evans & Co.
ATTORNEYS Patented May 16, 1944

2,349,078

UNITED STATES PATENT OFFICE 2,349,078

BUTTER CUTTING DEVICE

Theodore D. Crowley, Newark, and Benjamin C. Potter, Union, N. J.; Elsie Potter administratrix of said Benjamin C. Potter, deceased Application August 11, 1942, Serial No. 454,428

4 Claims. (Cl. 31—7)

This invention relates to butter cutting devices, and its general object is to provide a device that is primarily designed for cutting an elongated rectangular block or print of butter or the like into a plurality of sections, commonly known as pats for individual serving, such as for example in restaurants and the like.

A further object is to provide a butter cutting device that not only severs the butter into equal size sections, but the latter can be easily and expeditiously removed from the device, without becoming misshaped or otherwise damaged.

Another object is to provide a butter cutting device that can be maintained in a clean and sanitary condition in an easy and expeditious manner, and is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a front view of the device, partly in section.

Figure 2 is a sectional view taken approximately on line 2—2 of Figure 1, looking in the direction of the arrows.

Figure 3 is a fragmentary sectional view taken approximately on line 3—3 of Figure 1, looking in the direction of the arrows.

Figure 4 is a fragmentary view illustrating the manner by which the cut sections of butter are removed from the cutting means.

Referring to the drawing in detail, it will be noted that the device includes a flat rectangular base 1 having formed on the upper face thereof adjacent its ends, transversely disposed guide members 2. A rib 3 likewise formed on the base is disposed between the rear ends of the guide members for cooperation therewith to provide a seat for the cutting means, the latter when in use resting on the base between the guide members and in abutting engagement with the rib, as best shown in Figures 2 and 3.

The cutting means includes a flexible strip like back 4 preferably formed from rubber or the like and is of elongated rectangular formation to fit the seat, the back being slidably mounted on the base for disposal into and out of the seat, as will be apparent from Figure 3. In order to facilitate the application and removal of the cutting means, a handle 5 having an upwardly curved outer end portion, is fixed to the back and extends centrally from the forward longitudinal edge thereof. Secured to the back 4 and rising therefrom in equidistantly spaced parallel relation to each other, are transversely disposed blades 6 that have their lower ends embedded within the back and are held therein by retaining flanges 7.

Slidably mounted for vertical movement on parallel upright guide stems 8 that have their lower ends threadedly secured in the guide members 2 and the base 1, is an elongated rectangular pressing member that includes end walls 9, a top wall 10 and a rear wall 11. The front of the pressing member is open and the space between the walls provides a chamber for receiving a preformed block or print of butter. Transversely disposed ridges 12 are formed on the inner faces of the top and side walls and longitudinally disposed ridges 13 are formed on the inner face of the rear wall, the ridges cooperating with each other for holding the print within the chamber.

The end walls are provided with vertically arranged bores 14 extending throughout the height thereof for receiving the guide stems 8, and the latter have cap nuts 15 threaded on the upper ends thereof to provide stops for the pressing member. The bores 14 are enlarged from the lower ends thereof for a portion of their length to provide shoulders 16 having the upper ends of coil springs 17 bearing against the same for urging and holding the pressing member normally above the blades, the springs being sleeved on the stems and the lower ends of the springs bear against the guide members 2.

In the use of the device, a block or print of butter is placed within the chamber of the pressing member, and the latter is then lowered for forcing the print down on the blades, thus severing the print into sections that remain between the blades. The pressing member is then released to allow the springs to return the same to its normal position, and the cutting means with the sections of butter between the blades is withdrawn from its seat. The flexible back strip of the cutting means is then bowed longitudinally to effect separation of the blades, as shown at Figure 4, to facilitate removal of the butter sections B.

It is thought from the foregoing description that the advantages and novel features of the invention will be readily apparent.

It is to be understood that changes may be made in the construction and in the combination and arrangement of the several parts, provided that such changes fall within the scope of the appended claims.

What we claim is:

1. A cutting device for butter and the like, comprising a base, spaced parallel guide stems secured to and rising from the base, a pressing member including top, rear and end walls and an open front to provide a butter receiving chamber, said end walls being mounted on the stems for movement of the pressing member toward and away from the base, coil springs sleeved on the stems and bearing against the pressing member for normally holding the same elevated above the base, and cutting means removably mounted on the base and including a plurality of parallel equidistantly spaced blades arranged in the path of the pressing member to be received in the chamber for severing the butter into sections that remain between the blades.

2. A cutting device for butter and the like, comprising a base, spring actuated pressing means normally elevated above the base and guided for movement toward and away from the same, said pressing means having a butter receiving chamber therein, and cutting means removably mounted on the base and including a plurality of parallel equidistantly spaced blades arranged in the path of the pressing means to be received in the chamber for severing the butter into sections that remain between the blades, and said cutting means including a flexible back having the blades fixed thereto whereby upon flexing the back the blades are separated from the sections to facilitate removal thereof from beneath the blades.

3. A cutting device for butter and the like, comprising a base, a spring actuated pressing means normally elevated above the base and guided for movement toward and away from the same, said pressing means being provided with an elongated chamber opening through the front thereof for receiving a print of butter, said chamber being ridged for holding the print therein, cutting means removably mounted on the base and including a plurality of parallel equidistantly spaced blades arranged in the path of the pressing means to be received in the chamber for severing the butter into sections that remain between the blades, means secured to the base and providing a seat for receiving the cutting means to center the blades relative to the chamber, said cutting means including a flexible back having the blades fixed thereto whereby upon flexing the back the blades are separated from the sections to facilitate removal thereof from the blades, and a handle secured to the back to facilitate application and removal of the cutting means relative to its seat.

4. A device for cutting butter and the like comprising a base, spaced guide stems rising from the base, a pressing member having a butter receiving chamber opening through the lower end, said pressing member being mounted on the stems for movement toward and away from the base, springs bearing against opposed ends of the pressing member for resiliently holding the same in elevated position, and a plurality of spaced blades mounted on the base in the path of the pressing member and receivable in the chamber for cutting butter therein into sections.

THEODORE D. CROWLEY.
BENJAMIN C. POTTER.